United States Patent
Ma

(10) Patent No.: US 11,232,766 B2
(45) Date of Patent: Jan. 25, 2022

(54) DISPLAY DEVICE, DRIVING METHOD THEREOF, AND DISPLAY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Xinli Ma, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 17 days.

(21) Appl. No.: 16/638,285

(22) PCT Filed: Apr. 11, 2019

(86) PCT No.: PCT/CN2019/082324
§ 371 (c)(1),
(2) Date: Feb. 11, 2020

(87) PCT Pub. No.: WO2019/201158
PCT Pub. Date: Oct. 24, 2019

(65) Prior Publication Data
US 2020/0184926 A1   Jun. 11, 2020

(30) Foreign Application Priority Data
Apr. 16, 2018 (CN) .......................... 201810336654.X

(51) Int. Cl.
*G09G 5/10* (2006.01)
*G02F 1/13363* (2006.01)
*G09G 3/36* (2006.01)

(52) U.S. Cl.
CPC ........... *G09G 5/10* (2013.01); *G02F 1/13363* (2013.01); *G09G 3/3607* (2013.01);
(Continued)

(58) Field of Classification Search
CPC ................... G09G 5/10; G09G 3/3607; G09G 2320/0613; G09G 2320/068; G09G 2320/08; G09G 2358/00; G02F 1/13363
See application file for complete search history.

(56) References Cited

U.S. PATENT DOCUMENTS 10,380,957 B2 *  8/2019  Mizusako ............ G09G 3/3685
10,380,958 B2 *  8/2019  Shimmen ............ G09G 3/3611
(Continued)

FOREIGN PATENT DOCUMENTS

CN       102193248 A    9/2011
CN       202677021 U    1/2013
(Continued)

OTHER PUBLICATIONS

International Search Report of PCT/CN2019/082324 in Chinese, dated Jun. 27, 2019, with English translation.

*Primary Examiner* — Sejoon Ahn
(74) *Attorney, Agent, or Firm* — Collard & Roe, P.C.

(57) ABSTRACT

A display device, a driving method thereof and a display system are disclosed. The display device includes a display panel, a polarizer disposed on a side, where a light emitting surface of the display panel is located, of the display panel, and a phase retarder disposed on a side, where a light emitting surface of the polarizer is located, of the polarizer. The display region of the display panel includes a peep-proof area and a compensation area; the phase retarder includes a first phase retarder and a second phase retarder respectively corresponding to the peep-proof area and the compensation area; both the first and second phase retarder (Continued)

are a quarter-wave phase retarder; and the first and second phase retarder are configured to respectively convert light that is incident into the first phase retarder and the second phase retarder into polarized light with opposite rotation directions, in operation.

20 Claims, 5 Drawing Sheets

(52) U.S. Cl.
CPC ............... *G02F 1/133638* (2021.01); *G09G 2320/0613* (2013.01); *G09G 2320/0686* (2013.01); *G09G 2320/08* (2013.01); *G09G 2358/00* (2013.01)

(56) References Cited

U.S. PATENT DOCUMENTS

| | | | |
|---|---|---|---|
| 10,810,966 B1* | 10/2020 | Landgraf | G06K 9/00597 |
| 2014/0063379 A1 | 3/2014 | Seo et al. | |
| 2017/0003431 A1 | 1/2017 | Li | |
| 2019/0096359 A1* | 3/2019 | Uno | G09G 5/003 |
| 2019/0096360 A1* | 3/2019 | Xi | G09G 3/3607 |
| 2020/0184926 A1 | 6/2020 | Ma | |

FOREIGN PATENT DOCUMENTS

| | | | |
|---|---|---|---|
| CN | 104614885 A | 5/2015 |
| CN | 105182637 A | 12/2015 |
| CN | 105303979 A | 2/2016 |
| CN | 105842909 A | 8/2016 |
| CN | 108490693 A | 9/2018 |

\* cited by examiner

In a peep-proof display mode, inputting peep-proof display information into pixels in the peep-proof area, and inputting compensation display signals into pixels in the compensation area, so the image displayed by the peep-proof area is a peep-proof image, and the image combined from the image displayed by the compensation area and the image displayed by the peep-proof area is an interference image — S201

In a normal display mode, inputting first display signals into the pixels in the peep-proof area, and inputting second display signals into the pixels in the compensation area, so the image combined from the image displayed by the peep-proof area and the image displayed by the compensation area is a normal display image. — S202

Fig. 6

DISPLAY DEVICE, DRIVING METHOD THEREOF, AND DISPLAY SYSTEM

CROSS REFERENCE TO RELATED APPLICATIONS

This application is the National Stage of PCT/CN2019/082324 filed on Apr. 11, 2019, which claims priority under 35 U.S.C. § 119 of Chinese Application No. 201810336654.X filed on Apr. 16, 2018, the disclosure of which is incorporated by reference.

TECHNICAL FIELD

Embodiments of the present disclosure relate to relate to a display device, a driving method thereof and a display system.

BACKGROUND

At present, with the development of display technology and network technology, more and more people perform operations such as shopping or payment on the network. During the above operations, operators may need to input personal information via computers, mobile phones, ATMs, automatic ticket machines, and other devices that include display screens, which may cause the leakage of personal information.

SUMMARY

At least one embodiment of the present disclosure provides a display device, which comprises: a display panel, a polarizer disposed on a side, where a light emitting surface of the display panel is located, of the display panel, and a phase retarder disposed on a side, where a light emitting surface of the polarizer is located, of the polarizer. A display region of the display panel comprises a peep-proof area and a compensation area; the phase retarder comprises: a first phase retarder corresponding to the peep-proof area and a second phase retarder corresponding to the compensation area; both the first phase retarder and the second phase retarder are a quarter-wave phase retarder; and the first phase retarder and the second phase retarder are configured to respectively convert light that is incident into the first phase retarder and light that is incident into the second phase retarder into polarized light with opposite rotation directions, in operation.

For example, in at least one example of the display device, the first phase retarder and the second retarder are configured to convert the light that is incident into the first phase retarder and the light that is incident into the second phase retarder respectively into left-handed polarized light and right-handed polarized light, in operation; or the first phase retarder and the second phase retarder are configured to convert the light that is incident into the first phase retarder and the light that is incident into the second phase retarder respectively into right-handed polarized light and left-handed polarized light, in operation.

For example, in at least one example of the display device, the first phase retarder and the second phase retarder have complementary phase retardation characteristics.

For example, in at least one example of the display device, an absolute value of a phase retardation value caused by the first phase retarder and an absolute value of a phase retardation value caused by the second phase retarder are both equal to π/2.

For example, in at least one example of the display device, an included angle between a fast axis direction of the first phase retarder and a fast axis direction of the second phase retarder is 90°.

For example, in at least one example of the display device, the polarizer is configured to converter light that is emitted by the display device and incident into the polarizer into linearly polarized light, in operation; an included angle between a transmission axis of the polarizer and an optical axis of the first phase retarder and an included angle between the transmission axis of the polarizer and an optical axis of the second phase retarder are both 45°; and both the first phase retarder and the second phase retarder are configured to convert the linearly polarized light into circularly polarized light, in operation.

For example, in at least one example of the display device, in a peep-proof display mode, an image displayed by the peep-proof area is a peep-proof image, and an image combined from an image displayed by the compensation area and the image displayed by the peep-proof area is an interference image; and in a normal display mode, the image combined from the image displayed by the compensation area and the image displayed by the peep-proof area is a normal display image.

For example, in at least one example of the display device, the display device further comprises a controller. The controller is configured to allow the image combined from the image displayed by the compensation area and the image displayed by the peep-proof area to be a white image or a predetermined image.

For example, in at least one example of the display device, the display device further comprises a controller. The controller is configured to allow an average brightness of the image displayed by the compensation area to be greater than a maximum value of an average brightness of the image displayed by the peep-proof area in the peep-proof display mode.

For example, in at least one example of the display device, the controller is further configured to allow a ratio of the average brightness of the image displayed by the compensation area to the maximum value of the average brightness of the image displayed by the peep-proof area to be about 3-16 in the peep-proof display mode.

For example, in at least one example of the display device, the display panel comprises a plurality of pixels arranged in an array; and the peep-proof area comprises at least one pixel, and the compensation area comprises at least one pixel.

For example, in at least one example of the display device, the display panel comprises a plurality of peep-proof areas and a plurality of compensation areas; and the plurality of peep-proof areas and the plurality of compensation areas are alternately arranged in at least one of a row direction or a column direction.

For example, in at least one example of the display device, the plurality of peep-proof areas comprise pixels in odd rows, and the plurality of compensation areas comprise pixels in even rows; or the plurality of peep-proof areas comprise pixels in even rows, and the plurality of compensation areas comprise pixels in odd rows; or the plurality of peep-proof areas comprise pixels in odd columns, and the plurality of compensation areas comprise pixels in even columns; or the plurality of peep-proof areas comprise pixels in even columns, and the plurality of compensation areas comprise pixels in odd columns; or each compensation area comprises two rows of pixels, and each peep-proof area comprises one row of pixels; or each compensation area comprises two columns of pixels, and each peep-proof area comprises one column of pixels.

For example, in at least one example of the display device, an area of the compensation area is greater than an area of the peep-proof area.

For example, in at least one example of the display device, an orthographic projection of the first phase retarder on the display panel is overlapped with the peep-proof area; and an orthographic projection of the second phase retarder on the display panel is overlapped with the compensation area.

At least one embodiment of the present disclosure provides a display system, and the display system comprises: a pair of peep-proof glasses and a display device provided by any embodiment of the present disclosure. The pair of peep-proof glasses comprises a lens which is configured to transmit light outputted from the first phase retarder and block light outputted from the second phase retarder.

For example, in at least one example of the display system, the lens comprises a phase retardation film and a polarizing layer; the lens comprises a light-incident side, and compared with the polarizing layer, the phase retardation film is closer to the light-incident side; the phase retardation film is configured to convert the light outputted from the first phase retarder into first linearly polarized light, to convert the light outputted from the second phase retarder into second linearly polarized light, in operation, to allow a polarization direction of the first linearly polarized light to be perpendicular to a polarization direction of the second linearly polarized light, and to allow the polarization direction of the first linearly polarized light to be parallel to a transmission axis of the polarizing layer.

For example, in at least one example of the display system, the phase retardation film and the first phase retarder have same phase retardation characteristic, the phase retardation film and the second phase retarder have complementary phase retardation characteristics, and a transmission axis of the polarizing layer is perpendicular to a transmission axis of the polarizer; or the phase retardation film and the first phase retarder have complementary phase retardation characteristics, the phase retardation film and the second phase retarder have same phase retardation characteristic, and a transmission axis of the polarizing layer is parallel to a transmission axis of the polarizer.

For example, in at least one example of the display system, the pair of peep-proof glasses comprise a phase retardation film having same fast axis direction as the first phase retarder.

At least one embodiment of the present disclosure provides a driving method of a display device, which comprises: in a peep-proof display mode, inputting peep-proof display signals into pixels in the peep-proof area, and inputting compensation display signals into pixels in the compensation area, so as to allow an image displayed by the peep-proof area to be a peep-proof image and allow an image combined from an image displayed by the compensation area and the image displayed by the peep-proof area to be an interference image; and in a normal display mode, inputting first display signals into the pixels in the peep-proof area, and inputting second display signals into the pixels in the compensation area, so as to allow the image combined from the image displayed by the peep-proof area and the image displayed by the compensation area to be a normal display image.

For example, in at least one example of the driving method, the inputting the peep-proof display signals into the pixels in the peep-proof area and inputting the compensation display signals into the pixels in the compensation area in the peep-proof display mode comprises: in the peep-proof display mode, inputting peep-proof display signals corresponding a first brightness into the pixels in the peep-proof area, and inputting compensation display signals corresponding to a second brightness into the pixels in the compensation area; and allowing a sum of the second brightness of the pixels in the compensation area and the first brightness of the pixels in the peep-proof area adjacent to the compensation area to be a predetermined value, so as to allow the interference image to be an image with a grayscale corresponding to a predetermined value.

For example, in at least one example of the driving method, the predetermined value is 300 nit; and/or the first brightness is within 50 nit-100 nit, and the second brightness is within 350 nit-800 nit.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

FIG. 6 is a schematic flowchart of a driving method of a display device provided by some embodiments of the present disclosure.

DETAILED DESCRIPTION

Figure 1:
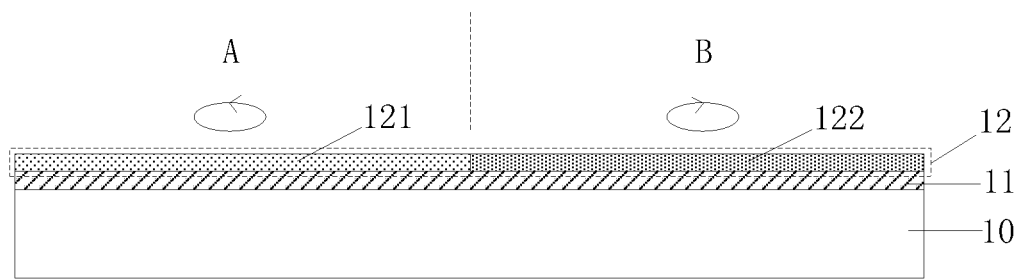
FIG. 1 is a first schematic structural view of a display device provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to ensure the security of personal information of a user of a display device, the peep-proof performance of the display device has received widespread attention. In addition, some special industries require special display devices so that confidential information can be transmitted only to specific personnel, which makes the special display devices need to have peep-proof capability.

The inventor of the present disclosure has noticed in research that a peep-proof display device can be manually switched between a privacy state and a sharing state by adopting a film with a gate structure. However, the inventor of the present disclosure have noticed that, in the privacy mode, the display brightness of the display device is significantly reduced. For example, the overall display brightness of the display device is reduced by about 40%. Therefore, although the display device can realize peep-proof display, the display effect during normal display is reduced, and thus the user experience is reduced.

Embodiments of the present disclosure provide a display device, a driving method thereof and a display system are disclosed. The display device includes a display panel, a polarizer disposed on a side, where a light emitting surface of the display panel is located, of the display panel, and a phase retarder disposed on a side, where a light emitting surface of the polarizer is located, of the polarizer. A display region of the display panel includes a peep-proof area and a compensation area; the phase retarder includes: a first phase retarder corresponding to the peep-proof area and a second phase retarder corresponding to the compensation area; both the first phase retarder and the second phase retarder are a quarter-wave phase retarder; and the first phase retarder and the second phase retarder are configured to respectively convert light that is incident into the first phase retarder and light that is incident into the second phase retarder into polarized light with opposite rotation directions, in operation. In some examples, the display device is cooperated with a pair of peep-proof glasses to realize peep-proof function.

Detailed description will be given below to specific embodiments of the display device, the driving method thereof and the display system provided by the embodiments of the present disclosure with reference to the accompanying drawings. In some examples, the thickness and the shape of film layers in the accompanying drawings do not reflect true scale and are only intended to illustrate the content of the present disclosure.

Some embodiments of the present disclosure provide a display device. As illustrated in FIG. 1, the display device comprises: a display panel 10, a polarizer 11 disposed on the side, where the light emitting surface of the display panel 10 is located, of the display panel 10, and a phase retarder (for example, a phase retardation layer) 12 disposed on the side, where the light emitting surface of the polarizer 1 is located, of the polarizer 1. The display region of the display panel 10 includes a peep-proof area A and a compensation area B. The phase retarder 12 is a quarter-wave phase retarder (both a first phase retarder 121 and a second phase retarder 122 described below are quarter-wave phase retarders). The phase retarder 12 includes: the first phase retarder 121 corresponding to the peep-proof area A and the second phase retarder 122 corresponding to the compensation area B. An included angle between a fast axis direction of the first phase retarder 121 and a fast axis direction of the second phase retarder 122 is 90°. In a peep-proof display mode, an image displayed by the peep-proof area A is a peep-proof image, and the image combined from an image displayed by the compensation area B and the image displayed by the peep-proof area A is an interference image. In a normal display mode, the image combined from the image displayed by the compensation area B and the image displayed by the peep-proof area A is a normal display image.

In some examples of the present disclosure, the peep-proof image refers to an image that a user of a display device (for example, a user who wears a pair of peep-proof glasses) does not want to be seen by other people (for example, a person who does not wear a pair of peep-proof glasses) and is displayed only to the user of the display device; the interference image refers to an image that can hide information carried by the peep-proof image; and the normal display image refers to an image that the user of the display device is willing to share with other people.

For example, the display device provided by an embodiment of the present disclosure may be cooperated with a pair of peep-proof glasses to realize peep-proof performance, and the pair of peep-proof glasses is configured to transmit light outputted from the first phase retarder and block light outputted from the second phase retarder. For example, as for the display device provided by an embodiment of the present disclosure, in a peep-proof display mode, the peep-proof area displays a peep-proof image, and the image combined from the image displayed by the compensation area and the image displayed by the peep-proof area is an interference image, so that the eyes of the user wearing a pair of peep-proof glasses can only receive the peep-proof image, and then the user wearing the pair of peep-proof glasses can view the peep-proof image; and the eyes of the user who watches the display device with naked eyes (namely the user who does not wear a pair of peep-proof glasses) receive both of the peep-proof image and the compensation image, so that the image viewed by the user who watches the display device with naked eyes is the interference image, and thus the peep-proof effect can be achieved. In a normal display mode, the image combined from the image displayed by the peep-proof area and the image displayed by the compensation area is a normal display image, so that the user can view the normal display image when watching the display device with naked eyes. The peep-proof display function of the display device provided by some embodiments of the present disclosure does not affect the display effect of normal display. Therefore, compared with the common peep-proof display device, the display device provided by some embodiments of the present disclosure has good display effect.

As illustrated in FIG. 1, the polarizer 11 is disposed on the side of the phase retarder 12 closer to the display panel 10. For example, the polarizer 11 may be a linear polarizer and may be configured to convert light (for example, naturally polarized light) that is incident on the linear polarizer into linearly polarized light, and the polarization direction of the linearly polarized light is parallel to a transmission axis of the polarizer 11. For example, because the polarizer 11 is disposed on the side, where the light emitting surface of the display panel 10 is located, of the display panel 10, light emitted from the display panel 10 (for example, naturally polarized light) is converted into linearly polarized light after passing through the polarizer 11.

For example, the phase retarder 12 is disposed on the side, where the light emitting surface of the polarizer 11 is located, of the polarizer 11, and is a quarter-wave phase retarder (for example, a quarter-wave plate), and the linearly polarized light is converted into elliptically polarized light or circularly polarized light after passing through the phase retarder 12. As illustrated in FIG. 1, the phase retarder 12 includes a first phase retarder 121 and a second phase retarder 122, and the first phase retarder 121 and the second phase retarder 122 are configured to respectively convert light that is incident into the first phase retarder 121 and light that is incident into the second phase retarder 122 into polarized light with opposite rotation directions.

For example, an orthographic projection of the first phase retarder 121 on the display panel 10 is overlapped with the peep-proof area, so that light emitted by the peep-proof area can pass through the first phase retarder 121 and exit from the display device; and an orthographic projection of the second phase retarder 122 on the display panel 10 is overlapped with the compensation area, so that light emitted by the compensation area can pass through the second phase retarder 122 and exit from the display device. For example, the orthographic projection of the first phase retarder 121 on the display panel 10 is completely overlapped with the peep-proof area, and the orthographic projection of the second phase retarder 122 on the display panel 10 is completely overlapped with the compensation area, thereby improving the peep-proof performance.

For example, the first phase retarder 121 and the second phase retarder 122 are configured to convert light that is incident into the first phase retarder 121 and light that is incident into the second phase retarder 122 respectively into left-handed polarized light and right-handed polarized light. For another example, the first phase retarder 121 and the second phase retarder 122 are configured to convert the light that is incident into the first phase retarder 121 and the light that is incident into the second phase retarder 122 respectively into right-handed polarized light and left-handed polarized light.

It should be noted that, when facing the direction opposite to the propagation direction of light, endpoints of the electrical vector of the left-handed polarized light rotate counterclockwise, and endpoints of the electrical vector of the right-handed polarized light rotate clockwise.

For example, the left-handed polarized light and the right-handed polarized light may be elliptically polarized light or circularly polarized light. For example, when an included angle between the polarization direction of the linearly polarized light and an optical axis of the phase retarder (for example, the first phase retarder 121 or the second phase retarder 122) is 45°, the phase retarder is configured to convert light that is incident into the phase retarder into circularly polarized light. For example, when the included angle between the polarization direction of the linearly polarized light and the optical axis of the phase retarder (for example, the first phase retarder 121 or the second phase retarder 122) is greater than 0° and less than 90°, the phase retarder is configured to convert the light that is incident into the phase retarder into elliptically polarized light.

For example, the first phase retarder 121 and the second phase retarder 122 have complementary phase retardation characteristics.

It should be noted that the description that the first phase retarder 121 and the second phase retarder 122 have complementary phase retardation characteristics refers to that the absolute value of a phase retardation value caused by the first phase retarder 121 is equal to the absolute value of a phase retardation value caused by the second phase retarder 122, and the sum of the phase retardation value caused by the first phase retarder 121 and the phase retardation value caused by the second phase retarder 122 is equal to zero.

It should be noted that the phase retardation value caused by the phase retarder (the first phase retarder 121 or the second phase retarder 122) refers to the variation, caused by the phase retarder, of the phase difference between ordinary light (o light) and extraordinary light (e light), which are in light passing through the phase retarder.

For example, both the absolute value of the phase retardation value caused by the first phase retarder 121 and the absolute value of the phase retardation value caused by the second phase retarder 122 are equal to $\pi/2$. In this case, the first phase retarder 121 and the second phase retarder 122 are configured to respectively convert light that is incident into the first phase retarder 121 and light that is incident into the second phase retarder 122 into polarized light with opposite rotation directions. For example, the first phase retarder 121 and the second phase retarder 122 are configured to convert the light that is incident into the first phase retarder 121 and the light that is incident into the second phase retarder 122 respectively into left-handed circularly polarized light and right-handed circularly polarized light.

For example, the optical axis of the phase retarder (for example, the first phase retarder 121 or the second phase retarder) is parallel to a surface of the phase retarder. For example, the included angle between the optical axis of the phase retarder (for example, the first phase retarder 121 or the second phase retarder) and the transmission axis of the polarizer 11 is 45°. For example, the linearly polarized light is perpendicularly incident into the phase retarder, namely the transmission direction of the linearly polarized light is perpendicular to the phase retarder. For example, the first phase retarder 121 is a positive crystal, and the second phase retarder 122 is a negative crystal. For another example, the first phase retarder 121 is a negative crystal, and the second phase retarder 122 is a positive crystal.

It should be noted that the light vector direction with fast propagation speed in the phase retarder is the fast axis. When the phase retarder is a positive crystal, the speed of ordinary light in the phase retarder is greater than the speed of extraordinary light. Thus, the light vector direction of the ordinary light in the phase retarder is the fast axis of the phase retarder. When the phase retarder is a negative crystal, the speed of the extraordinary light in the phase retarder is greater than the speed of the ordinary light. Thus, the light vector direction of the extraordinary light in the phase retarder is the fast axis of the phase retarder.

For example, the fast axis of the phase retarder may also be taken as reference. In this case, when the included angle between the transmission axis direction of the polarizer 11 and the fast axis direction of the phase retarder is 45°, the obtained light is circularly polarized light. When the included angle between the transmission axis direction of the polarizer 11 and the fast axis direction of the phase retarder is other angles (for example, other angles except 0°, 90° and 45°), the obtained light is elliptically polarized light.

For clarity, description is given in an embodiment of the present disclosure by taking the case that light passing through the phase retarder 12 is converted into circularly polarized light as an example. In this case, the included angle between the transmission axis direction of the polarizer 11 and the fast axis (or optical axis) direction of the phase retarder (for example, the first phase retarder 121 or the second phase retarder 122) in an embodiment of the present disclosure is 45°. But the values of the included angle between the transmission axis of the polarizer and the fast axis (or the optical axis) of the phase retarder is not limited in an embodiment of the present disclosure.

Figure 2:
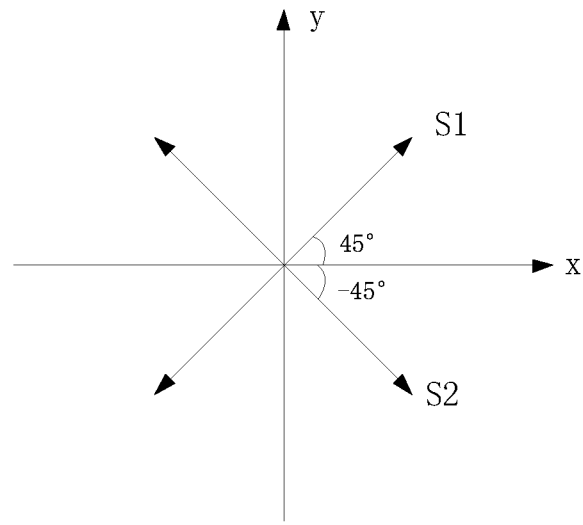
FIG. 2 is a schematic diagram illustrating fast axis directions of a first phase retarder and a second phase retarder in some embodiments of the present disclosure.

For example, the included angle between the fast axis direction of the first phase retarder 121 and the fast axis direction of the second phase retarder 122 is 90°. For example, as illustrated in FIG. 2, when the transmission axis direction of the polarizer 11 is horizontal direction (namely the x direction as illustrated by the arrow in the figure), the included angle between the fast axis direction (namely the direction as illustrated by S1 in the figure) of the first phase retarder 121 and the horizontal direction may be 45°, and the included angle between the fast axis direction (namely the direction as illustrated by S2 in the figure) of the second phase retarder 122 and the horizontal direction may be −45°. In this case, the circularly polarized light obtained after the light passes through the first phase retarder 121 and the circularly polarized light obtained after the light passes through the second phase retarder 122 has different rotation directions. For example, left-handed circularly polarized light is obtained after the light passes through the first phase retarder 121, and right-handed circularly polarized light is obtained after the light passes through the second phase retarder 122.

If a user wears a corresponding pair of peep-proof glasses, for example, glasses that can only transmit left-handed circularly polarized light, the user can only view the image displayed by the peep-proof area A and cannot view the image displayed by the compensation area B. Thus, in a peep-proof display mode, the peep-proof area A may be controlled to display the peep-proof image, and the user wearing the corresponding pair of peep-proof glasses views the peep-proof image; and meanwhile, the compensation area B is controlled to display the compensation image, and the image displayed by the compensation area B and the image displayed by the peep-proof image A is combined into the interference image, so the image viewed by the user who watches the display device with naked eyes is the interference image, thereby achieving peep-proof effect.

In actual application, the transmission axis direction of the polarizer and the fast axis direction of the phase retarder may be adjusted according to actual conditions. For example, when the included angle between the transmission axis of the polarizer and the horizontal direction is 45°, the fast axis direction of the first phase retarder may be set to be the horizontal direction, and the fast axis direction of the second phase retarder may be set to be the vertical direction. The transmission axis direction of the polarizer and the fast axis direction of the phase retarder are not limited here.

For example, in a normal display mode, the peep-proof area A and the compensation area B may be taken as a whole to realize the display function of the display device. For example, the image combined from the image displayed by the peep-proof area A and the image displayed by the compensation area B may be a normal display image, so the user who watches the display device with naked eyes can view the normal display image. Thus, the peep-proof display function of the display device provided by some embodiments of the present disclosure does not affect the display effect of the normal display image. For example, in the normal display mode, all the pixels in the display region participate in display. In this case, the resolution and the display effect of the display panel are not affected.

For example, in specific implementation, for example, the light emitted from the display panel may be natural light, elliptically polarized light, circularly polarized light and linearly polarized light that is not perpendicular to the transmission axis direction of the polarizer, as long as the light emitted from the display panel can pass through the polarizer. For example, the display panel may be an organic light-emitting diode (OLED) display panel and may also be a liquid crystal display (LCD). For example, the LCD panel may be based on twisted (TN) mode, advanced super dimension (ADS) mode or vertical alignment (VA) mode. The type of the display panel is not limited here.

Figure 3:
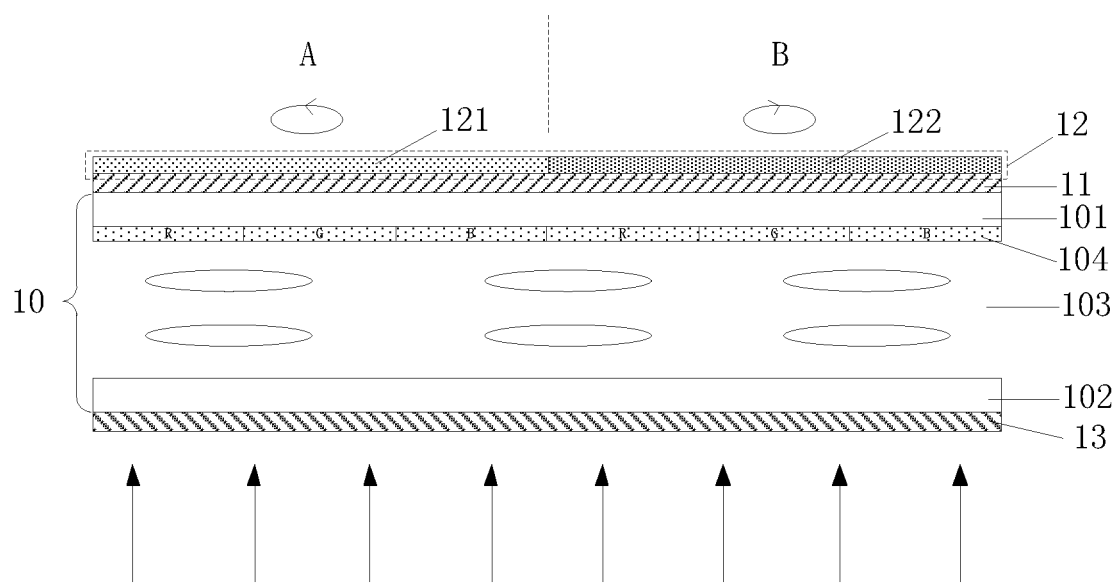
FIG. 3 is a second schematic structural view of the display device provided by some embodiments of the present disclosure.

Illustration is given in FIG. 3 by taking the case that the display panel is an LCD panel as an example. As illustrated in FIG. 3, the display panel 10 may include: a color filter (CF) substrate 101, an array substrate 102, and a liquid crystal layer 103 disposed between the CF substrate 101 and the array substrate 102, and a CF layer 104 is disposed on the CF substrate 101 (for example, the CF substrate 101 includes the CF layer 104). An upper polarizer and a lower polarizer 13 are also disposed on the outside of the display panel 10. For example, the upper polarizer is disposed on the side of the CF substrate 101 away from the array substrate 102, and the lower polarizer is disposed on the side of the array substrate 102 away from the CF substrate 101. For example, the upper polarizer and the polarizer 11 may be implemented as the same polarizer. That is to say, when the display panel is the LCD panel, the polarizer 11 may be used as the upper polarizer of the display panel 10 (namely the polarizer disposed on the light-emitting side of the display panel). In this case, the display panel 10 does not need to be provided with the upper polarizer. For another example, the upper polarizer and the polarizer 11 may also respectively adopt two polarizers of which the transmission axis directions are not perpendicular to each other. No limitation will be given here.

For example, in the display device provided by an embodiment of the present disclosure, the display panel may include a plurality of pixels arranged in an array. For example, each pixel includes a plurality of subpixels (for example, red subpixels, green subpixels and blue subpixels). For example, each peep-proof area includes at least one pixel (for example, one row or one column of display pixels), and each display region includes at least one pixel (for example, one row or one column of display pixels). For example, in the peep-proof display mode, the peep-proof area is used for displaying the peep-proof image and the compensation area is used for displaying the compensation image, so that the image combined from the image displayed by the compensation area and the image displayed by the peep-proof area is an interference image.

For example, the display panel may include a plurality of peep-proof areas and a plurality of compensation areas, and the plurality of peep-proof areas and the plurality of compensation areas are alternately arranged in the row direction and/or the column direction. For example, when the display panel includes the plurality of peep-proof areas and the plurality of compensation areas, the phase retarder includes a plurality of first phase retarders and a plurality of second phase retarders; the plurality of first phase retarders are respectively opposite to the plurality of peep-proof areas; and the plurality of second phase retarders are respectively opposite to the plurality of compensation areas. For example, when the plurality of peep-proof areas and the plurality of compensation areas are alternately arranged in the row direction and/or the column direction, the plurality of first phase retarders and the plurality of second phase retarders are alternately arranged in the row direction and/or the column direction.

For example, through allowing the peep-proof areas and the compensation areas to be alternately arranged, a position near each peep-proof area is disposed with a compensation area, so as to improve the interference effect of the compensation area on the peep-proof area and/or provide convenience for the overlay of the images of the compensation area and the peep-proof area, improve the interference effect of the interference image, and prevent the user who watches the display device with naked eyes from viewing the peep-proof image (cannot clearly view the peep-proof image).

For example, in the display device provided by an embodiment of the present disclosure, the arrangement mode of the plurality of peep-proof areas and the plurality of compensation areas may adopt any one of the arrangement modes as illustrated in FIGS. 4A to 4D. For example, in FIGS. 4A to 4D, A1, A2, A3, A4, A5 and the like represent the peep-proof areas; B1, B2, B3, B4, B5 and the like represent the compensation areas; and the numbers 1, 2, 3 . . . 10 . . . indicate pixel row number or pixel column number.

Figure 4A:
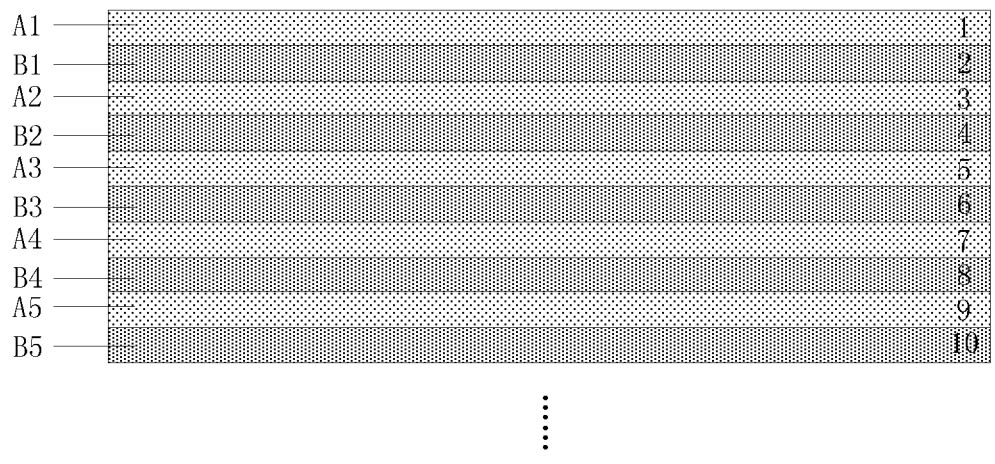
FIGS. 4A to 4D are schematic diagrams illustrating arrangements of peep-proof areas and compensation areas in some embodiments of the present disclosure.

For example, as illustrated in FIG. 4A, the plurality of peep-proof areas (as illustrated by A1, A2, A3, A4, A5 and the like in FIG. 4A) may correspond to (include) pixels in odd rows, and the plurality of compensation areas (as illustrated by B1, B2, B3, B4, B5 and the like in FIG. 4A) may correspond to pixels in even rows.

Figure 4B:
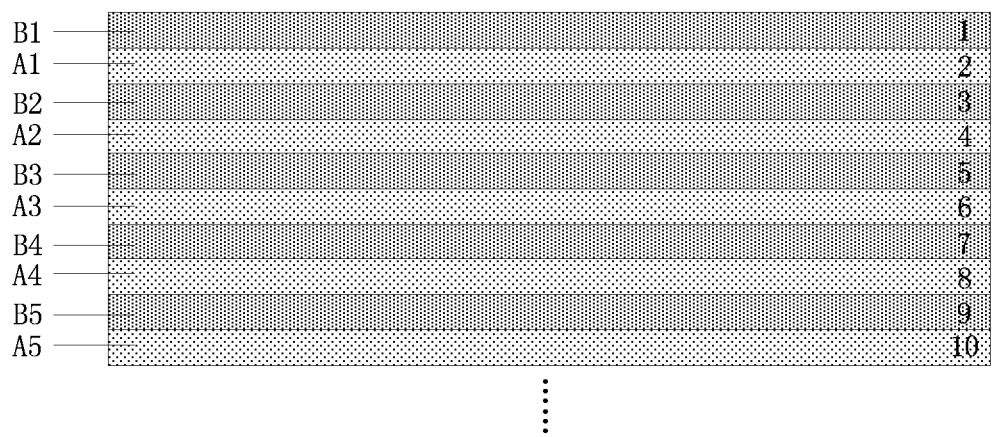

For example, as illustrated in FIG. 4B, the plurality of peep-proof areas (as illustrated by A1, A2, A3, A4, A5 and the like in FIG. 4B) may correspond to (include) pixels in even rows, and the plurality of compensation areas (as illustrated by B1, B2, B3, B4, B5 and the like in FIG. 4B) may correspond to (include) pixels in odd rows.

Figure 4C:
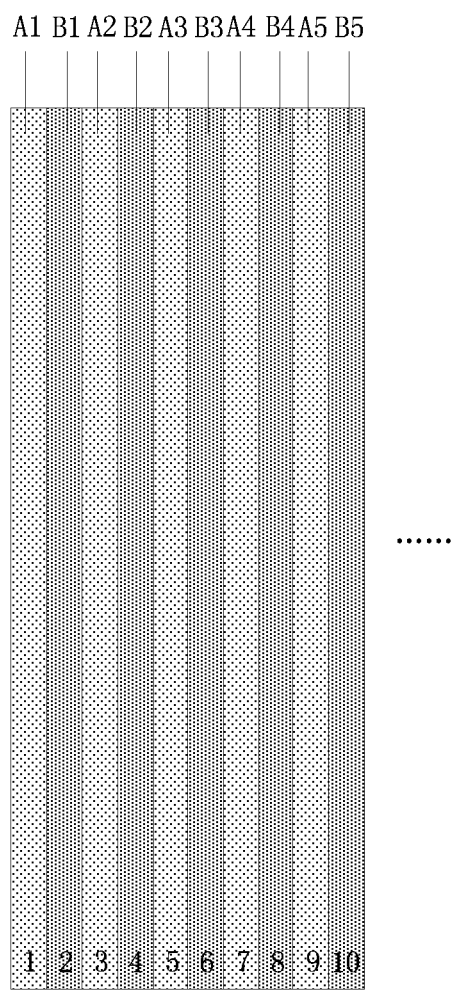

For example, as illustrated in FIG. 4C, (as illustrated by A1, A2, A3, A4, A5 and the like in FIG. 4C) may correspond to (include) pixels in odd columns, and the plurality of compensation areas (as illustrated by B1, B2, B3, B4, B5 and the like in FIG. 4C) may correspond to (include) pixels in even columns.

Figure 4D:
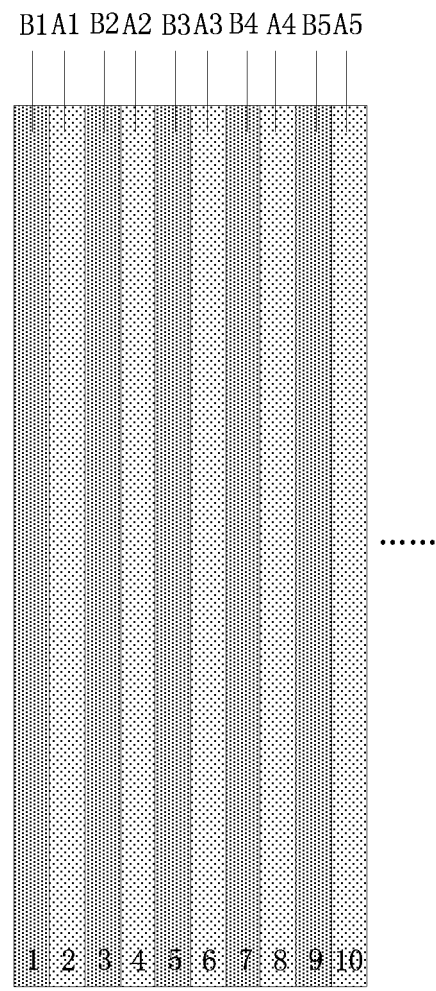

For example, as illustrated in FIG. 4D, (as illustrated by A1, A2, A3, A4, A5 and the like in FIG. 4D) may correspond to (include) pixels in even columns, and the plurality of compensation areas (as illustrated by B1, B2, B3, B4, B5 and the like in FIG. 4D) may correspond to (include) pixels in odd columns.

In the arrangement mode as illustrated in FIGS. 4A to 4D, the area of the peep-proof area and the area of the compensation area are same or the difference of the area of the peep-proof area and the area of the compensation area is equal to the area of only one row or one column of pixels. In this case, for example, the peep-proof areas and the compensation areas are uniform, so that the display effect in normal display mode is good, and the display uniformity of the display panel is not adversely affected. It should be noted that the arrangement modes as illustrated in FIGS. 4A to 4D are only for illustration, and in specific implementation, the peep-proof areas and the compensation areas may also be arranged in other modes, for example, alternately arranged in both the row direction and the column direction, so that the peep-proof areas and the compensation areas can form a checkerboard pattern. In this case, the interference effect of the compensation areas can be better. The arrangement mode of the peep-proof areas and the compensation areas is not limited here.

For example, in actual application, in examples of some display devices provided by an embodiment of the present disclosure, the area of the compensation area may be greater than the area of the peep-proof area. In peep-proof display mode, the compensation area is adopted to display the compensation image, so that the image combined from the image displayed by the compensation area and the image displayed by the peep-proof area is an interference image, and thus the image viewed by the user who watches the display device with naked eyes is the interference image, thereby preventing the peep-proof image from being viewed by the user who watches the display device with naked eyes. For example, through allowing the area of the compensation area to be set to be greater than the area of the peep-proof area, the interference capability of the image displayed by the compensation area on the image displayed by the peep-proof area is higher in the peep-proof display mode. In this case, the interference capability of the interference image displayed by the display device is higher. Thus, the peep-proof performance of the display device is better.

For example, in the peep-proof display mode, the compensation area is used for realizing interference function. For example, the method for allowing the area of the compensation area to be greater than the area of the peep-proof area may be selected according to actual application demands, and no specific limitation will be given in embodiments of the present disclosure in this respect. For example, the area of pixels (a single pixel) in the compensation area may be set to be greater than the area of pixels in the peep-proof area. In this case, the number of the pixels in the compensation area may be equal to or greater than the number of the pixels in the peep-proof area. For another example, the number of the pixels in the compensation area may also be greater than the number of the pixels in the peep-proof area. In this case, the area of the pixels in the compensation area may be equal to or greater than the area of the pixels in the peep-proof area. No limitation will be given here.

For example, in some examples of the display device provided by an embodiment of the present disclosure, the compensation area may correspond to two rows of pixels, and the peep-proof area may correspond to one row of pixels. For another example, the compensation area may correspond to two columns of pixels, and the peep-proof area may correspond to one column of pixels. For example, the ratio of the number of the pixels (or the number of rows of pixels or the number of columns of pixels) in the compensation area to the number (or the number of rows of pixels or the number of columns of pixels) of the pixels in the peep-proof area is not limited to 2:1. According to actual application demands, the ratio of the number of the pixels in the compensation area to the number of the pixels in the peep-proof area may also be implemented as N:1, and N is a natural number greater than 1.

In some embodiments of the present disclosure, in order to improve the interference capability of the interference image, the area of the compensation area may be set to be greater than the area of the peep-proof area. For example, the compensation area may be set to correspond to (include) two rows of pixels, and the peep-proof area may be set to correspond to (include) one row of pixels, or the compensation area is set to correspond to (include) two columns of pixels, and the peep-proof area is set to correspond to (include) one column of pixels. Thus, two rows (or two columns) of pixels in the compensation area are disposed on each side of both sides of each row (or each column) of pixels in the peep-proof area, so that the capability of the image displayed by the compensation area in interfering with the image displayed by the peep-proof area is stronger and/or the compensation image displayed by the compensation area and the peep-proof image displayed by the peep-proof area can be easily superimposed to be the interference image, thereby improving the interference capability of the interference image. For example, because the peep-proof areas and the compensation areas are respectively uniformly arranged in the display device, the arrangement of the peep-proof areas and the compensation areas does not affect the display uniformity of the display device.

In some examples, the display device further comprises a drive circuit and a controller. The drive circuit is configured to provide driving signals for a plurality of pixels in the display device, so that the plurality of pixels present required brightness. For example, the controller is configured to control the drive circuit to allow the plurality of pixels to present required brightness.

For example, the controller is configured to allow the brightness of a single pixel in the compensation area to be greater than the brightness of a single pixel in the peep-proof area in the peep-proof display mode, so that the light emitted by the compensation area can cause strong interference on the light emitted by the peep-proof area, and thus it can be difficult for the naked-eye user to view the image displayed by the peep-proof area. For example, the controller is configured to allow the average brightness of the image displayed by the compensation area to be greater than the maximum of the average brightness of the image displayed by the peep-proof area. The ratio of the average brightness of the image displayed by the compensation area to the maximum of the average brightness of the image displayed by the peep-proof area is about 3-16. For example, the maximum of the average brightness of the image displayed by the peep-proof area is within the range of 50 nit-100 nit, and the average brightness of the image displayed by the compensation area is within the range of 350 nit-800 nit.

For another example, the controller may also be configured to allow an image combined from the image displayed by the compensation area and the image displayed by the peep-proof area to be a white image or a predetermined image (namely the interference image is a white image or a predetermined image) in the peep-proof display mode, so that it can be difficult for the naked-eye user to view the image displayed by the peep-proof area. For example, the white image refers to an image with uniform brightness (for example, the ratio of the difference between the highest brightness and the lowest brightness to the average brightness of the white image is less than 5%). For example, the predetermined image refers to an image that the user of the display device hopes to be viewed by the naked-eye user or a preset image (for example, thanks for watching). For example, the specific setting mode of the controller may refer to the driving method of the display device, and no further description will be given here.

For example, when the combined image of the image displayed by the compensation area and the image displayed by the peep-proof image is a white image or a predetermined image, the average brightness of the image displayed by the compensation area may also be greater than the maximum of the average brightness of the image displayed by the peep-proof area, so as to further improve the peep-proof effect.

The display device provided by an embodiment of the present disclosure may be applied to any product or component with display function such as a mobile phone, a tablet PC, a TV, a display, a notebook computer, a digital album or a navigator.

An embodiment of the present disclosure further provides a display system. For example, the principle of the display system in solving problems is similar to that of the display device, so the specific implementation of the display system may refer to the implementation of the display device, and no further description will be given here.

Figure 5:
FIG. 5 is a schematic structural view of a display system provided by some embodiments of the present disclosure.
Figure 5:
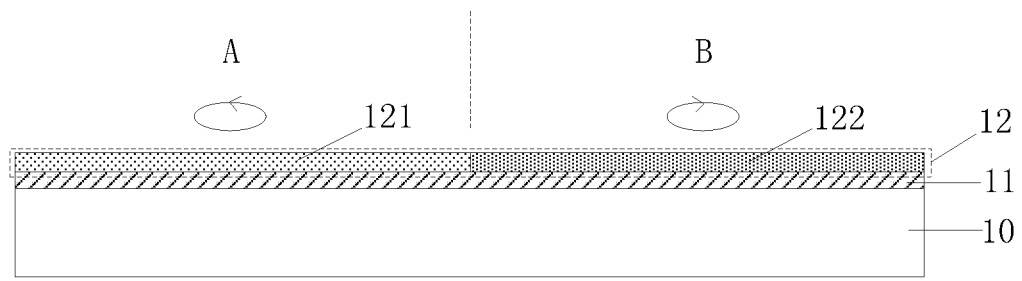

An embodiment of the present disclosure provides a display system. As illustrated in FIG. 5, the display system comprises the display device provided by any embodiment of the present disclosure and a pair of peep-proof glasses 14.

For example, the pair of peep-proof glasses 14 (lenses of the pair of peep-proof glasses 14) are configured to transmit light outputted from the first phase retarder and block light outputted from the second phase retarder, so that the eyes of the user wearing the pair of peep-proof glasses 14 can only receive the image displayed by the peep-proof area, such that the image displayed by the compensation area cannot interference with the image displayed by the peep-proof area. Thus, the user wearing the pair of peep-proof glasses 14 can acquire information carried by the image displayed by the peep-proof area.

For example, the pair of peep-proof glasses 14 (a lens of the pair of peep-proof glasses 14) include a phase retardation film and a polarizing layer. The phase retardation film is disposed on a light-incident side of the lens of the pair of peep-proof glasses, and the polarizing layer is disposed on a light-emitting side of the lens of the pair of peep-proof glasses. That is to say, light that is incident into the lens of the pair of peep-proof glasses 14 is sequentially incident into the phase retardation film and the polarizing layer. For example, compared with the phase retardation film, the polarizing layer is closer to the eye of the user.

For example, the phase retardation film may be implemented as a quarter-wave plate (namely a quarter-wave phase retarder) and is configured to convert the light outputted from the first phase retarder into first linearly polarized light and convert the light outputted from the second phase retarder into second linearly polarized light, and the polarization direction of the first linearly polarized light is perpendicular to the polarization direction of the second linearly polarized light.

For example, the polarizing layer is configured to be a linear polarizer, and a transmission axis of the polarizing layer is parallel to the polarization direction of the first linearly polarized light and perpendicular to the polarization direction of the second linearly polarized light. In this case, the first linearly polarized light can pass through the lenses of the pair of peep-proof glasses 14 and the second linearly polarized light cannot pass through the lenses of the pair of peep-proof glasses 14. Thus, the pair of peep-proof glasses 14 is configured to only transmit the light outputted from the first phase retarder and not transmit the light outputted from the second phase retarder. Thus, the eyes of the user wearing the pair of peep-proof glasses 14 can only receive the image displayed by the peep-proof area, and the image displayed by the compensation area cannot interference with the image displayed by the peep-proof area.

For example, the specific setting mode of the phase retardation film and the polarizing layer may be set according to actual application demands, and no specific limitation will be given in an embodiment of the present disclosure in this respect.

In one example, the phase retardation film and the polarizing layer are parallel to each other. For example, the phase retardation film and the first phase retarder may have same phase retardation characteristic; the phase retardation film and the second phase retarder may have complementary phase retardation characteristics; and the transmission axis of the polarizing layer is perpendicular to the transmission axis of the polarizer 11.

For example, the description that the phase retardation film and the second phase retarder have complementary phase retardation characteristics refers to that the absolute value of the variation, caused by the second phase retarder, of the phase difference between ordinary light (o light) and extraordinary light (e light) in light passing through the second phase retarder is equal to the absolute value of the variation, caused by the phase retardation film, of the phase difference between ordinary light (o light) and extraordinary light (e light) in light passing through the phase retardation film, and the variation, caused by the second phase retarder, of the phase difference between the ordinary light (o light) and the extraordinary light (e light) in the light passing through the second phase retarder and the variation, caused by the phase retardation film, of the phase difference between the ordinary light (o light) and the extraordinary light (e light) in the light passing through the phase retardation film are opposite in sign. In this case, the sum of the variation, caused by the first phase retarder, of the phase difference between ordinary light (o light) and extraordinary light (e light) in light passing through the first phase retarder and the variation, caused by the phase retardation film, of the phase difference between the ordinary light (o light) and the extraordinary light (e light) in the light passing through the phase retardation film is equal to zero.

For example, the description that the phase retardation film and the first phase retarder have the same phase retardation characteristic refers to that the variation, caused by the first phase retarder, of the phase difference between the ordinary light (o light) and the extraordinary light (e light) in the light passing through the first phase retarder is equal to the variation, caused by the phase retardation film, of the phase difference between the ordinary light (o light) and the extraordinary light (e light) in the light passing through the phase retardation film.

For example, the variation, caused by the first phase retarder, of the phase difference between the ordinary light (o light) and the extraordinary light (e light) in the light passing through the first phase retarder is $+\pi/2$; the variation of the second phase retarder on the phase difference between the ordinary light (o light) and the extraordinary light (e light) in the light passing through the second phase retarder is $-\pi/2$; and the variation, caused by the phase retardation film, of the phase difference between the ordinary light (o light) and the extraordinary light (e light) in the light passing through the phase retardation film is also $+\pi/2$. In this case, the combined structure of the first phase retarder and the phase retardation film is configured to allow the polarization direction of the light that is sequentially incident into the first phase retarder and the phase retardation film to rotate 90°, and the combined structure of the second phase retarder and the phase retardation film is configured to allow the polarization direction of the light that is sequentially incident into the second phase retarder and the phase retardation film to be kept constant. That is to say, the polarization direction of the light emitted by the peep-proof area and outputted from the phase retardation film is perpendicular to the transmission axis of the polarizer 11, and the polarization direction of the light emitted by the compensation area and outputted from the phase retardation film is parallel to the transmission axis of the polarizer 11. For example, because the transmission axis of the polarizing layer is perpendicular to the transmission axis of the polarizer 11, the light emitted by the peep-proof area and outputted from the phase retardation film (namely first linearly polarized light) can pass through the polarizing layer and be incident into the eyes of the user, and the light emitted by the compensation area and outputted from the phase retardation film (namely second linearly polarized light) cannot pass through the polarizing layer and cannot be incident into the eyes of the user.

In another example, the phase retardation film and the polarizing layer are parallel to each other; the phase retardation film and the first phase retarder may have complementary phase retardation characteristics; the phase retardation film and the second phase retarder have the same phase retardation characteristic; and the transmission axis of the polarizing layer is parallel to the transmission axis of the polarizer 11.

For example, the variation, caused by the first phase retarder, of the phase difference between the ordinary light (o light) and the extraordinary light (e light) in the light passing through the first phase retarder is $+\pi/2$; the variation of the second phase retarder on the phase difference between the ordinary light (o light) and the extraordinary light (e light) in the light passing through the second phase retarder is $-\pi/2$; and the variation, caused by the phase retardation film, of the phase difference between the ordinary light (o light) and the extraordinary light (e light) in the light passing through the phase retardation film is also $-\pi/2$. In this case, the combined structure of the first phase retarder and the phase retardation film is configured to allow the polarization direction of the light that is sequentially incident into the first phase retarder and the phase retardation film to be kept constant, and the combined structure of the second phase retarder and the phase retardation film is configured to allow the polarization direction of the light that is sequentially incident into the second phase retarder and the phase retardation film to rotate 90°. That is to say, the polarization direction of the light emitted by the peep-proof area and outputted from the phase retardation film is parallel to the transmission axis of the polarizer 11, and the polarization direction of the light emitted by the compensation area and outputted from the phase retardation film is perpendicular to the transmission axis of the polarizer 11. For example, because the transmission axis of the polarizing layer is parallel to the transmission axis of the polarizer 11, the light emitted by the peep-proof area and outputted from the phase retardation film (namely first linearly polarized light) can pass through the polarizing layer and be incident into the eyes of the user, and the light emitted by the compensation area and outputted from the phase retardation film (namely second linearly polarized light) cannot pass through the polarizing layer and cannot be incident into the eyes of the user.

For example, the relationships among the optical axis (or the fast axis) of the phase retardation film, the optical axis (or the fast axis) of the first phase retarder, the optical axis (or the fast axis) of the second phase retarder, the transmission axis of the polarizer 11, and the transmission axis of the polarizing layer may be set according to actual application demands No specific settings will be given in an embodiment of the present disclosure in this respect.

For example, the pair of peep-proof glasses 14 includes a phase retardation film (not shown in the figure) having the same fast-axis direction as the first phase retarder 121. For example, because the pair of peep-proof glasses 14 include the phase retardation film having the same fast-axis direction with the first phase retarder 121, the light outputted from the first phase retarder 121 can pass through the pair of peep-proof glasses 14, and the light outputted from the second phase retarder 122 cannot pass through the pair of peep-proof glasses 14. For example, the included angle between the fast-axis direction of the first phase retarder 121 and the horizontal direction and the included angle between the fast-axis direction of the phase retardation film of the pair of peep-proof glasses 14 and the horizontal direction are both 45°, and the included angle between the fast-axis direction of the second phase retarder 122 and the horizontal direction is −45°. Thus, the light outputted from the first phase retarder 121 is left-handed circularly polarized light, and the light outputted from the second phase retarder 122 is right-handed circularly polarized light. The phase retardation film of the pair of peep-proof glasses 14 is configured to allow the left-handed circularly polarized light to pass through the pair of peep-proof glasses 14 (the lenses of the pair of peep-proof glasses 14) and allow the right-handed circularly polarized light to be unable to pass through the pair of peep-proof glasses 14 (the lenses of the pair of peep-proof glasses 14). Therefore, the pair of peep-proof glasses 14 can only transmit the image displayed by the peep-proof area, so the user wearing the pair of peep-proof glasses 14 can view the peep-proof image displayed by the peep-proof area, and the user who watches the display device with naked eyes views the overlay image displayed by the peep-proof area and the compensation area, thereby realizing peep-proof display.

For example, an embodiment of the present disclosure further provides a driving method of the above display device. For example, the principle of the driving method in solving problems is similar to that of the above display device, so the specific implementation of the driving method may refer to the implementation of the display device, and no further description will be given here.

An embodiment of the present disclosure provides a driving method of the above display device. As illustrated in FIG. 6, the driving method comprises at least one of the step S201 or the step S202.

S201: in a peep-proof display mode, inputting peep-proof display information into pixels in the peep-proof area, and inputting compensation display signals into pixels in the compensation area, so the image displayed by the peep-proof area is a peep-proof image, and the image combined from the image displayed by the compensation area and the image displayed by the peep-proof area is an interference image.

S202: in a normal display mode, inputting first display signals into the pixels in the peep-proof area, and inputting second display signals into the pixels in the compensation area, so the image combined from the image displayed by the peep-proof area and the image displayed by the compensation area is a normal display image.

For example, in the driving method of the display device provided by some embodiments of the present disclosure, in the peep-proof display mode, the peep-proof display signals are inputted into the pixels in the peep-proof area, and the compensation display signals are inputted into the pixels in the compensation area, so the image displayed by the peep-proof area is the peep-proof image and the image combined from the image displayed by the compensation area and the image displayed by the peep-proof area is the interference image, and thus the user wearing the pair of peep-proof glasses can view the peep-proof image and the user who watches the display device with naked eyes can only view the interference image, thereby achieving the peep-proof effect. For example, in the normal display mode, the first display signals are inputted into the pixels in the peep-proof area, and the second display signals are inputted into the pixels in the compensation area, so that the image combined from the compensation area and the peep-proof area is the normal display image, and then the user who watches the display device with naked eyes can view the normal display image. For example, in the driving method provided by some embodiments of the present disclosure, in different display modes, different display signals are inputted into pixels corresponding to the peep-proof area and the compensation area, so that the display device not only can realize peep-proof display but also can switch between the peep-proof display mode and the normal display mode. For example, the peep-proof area does not affect the display effect under normal display mode, thereby widening the application scenarios and uses of the display device.

For example, in the driving method provided by an embodiment of the present disclosure, the step of inputting the peep-proof display signals into the pixels in the peep-proof area and inputting the compensation display signals into the pixels in the compensation area in the peep-proof display mode in the step S201 may include:

In the peep-proof display mode, inputting peep-proof display signals corresponding to the first brightness into the pixels in the peep-proof area, and inputting compensation display signals corresponding to the second brightness into the pixels in the compensation area, in which the sum of the second brightness of the pixels in the compensation area and the first brightness of the pixels in the peep-proof area adjacent with the compensation area is a predetermined value, so as to allow the interference image to be an image with a grayscale corresponding to the predetermined value.

In the peep-proof display mode, the sum of the second brightness of the pixels in the compensation area and the first brightness of the pixels in the peep-proof area adjacent with the compensation area is a predetermined value, so that the overlay effect of the compensation image displayed by the compensation area and the peep-proof image displayed by the peep-proof area is a white image with a certain grayscale, and thus the user who watches the display device with naked eyes can only view the white image and cannot view any display information, thereby achieving the peep-proof effect. The grayscale value of the white image corresponds to the sum of the first brightness and the second brightness (namely the predetermined value), and the voltage values corresponding to the first brightness and the second brightness may be determined by the relationship between the voltage and the transmittance (namely the V-T curve).

In actual application, in the peep-proof display mode, if the peep-proof image to be displayed is an image with a single color, the first brightness of the pixels in the peep-proof area may be the same value; and if the peep-proof image is a color image, the first brightness of the pixels in the peep-proof area may also be different values. Similarly, the second brightness may also be determined according to the compensation image to be displayed. The first brightness here refers to the brightness of the pixels in corresponding peep-proof area, and the second brightness refers to the brightness of the pixels in corresponding compensation area. The first brightness and the second brightness are not limited.

For example, when the plurality of peep-proof areas and the plurality of compensation areas are alternately arranged in the row direction, pixels in the Mth row of each peep-proof area and pixels in the Mth row of a compensation area adjacent to the peep-proof area in the row direction (disposed on the right of the peep-proof area) form a pixel group. In this case, the display panel comprises a plurality of pixel groups arranged in an array. For example, a predetermined brightness value may be set for each pixel group. For example, the brightness values of different pixel groups may be same (e.g., 300 nit), so that the display panel displays a white image. For another example, the brightness values of different pixel groups may allow the display panel to display a predetermined image (e.g., thanks for watching). For example, in the case of determining the brightness value of each pixel in the peep-proof area, the brightness value of each pixel in the compensation area (e.g., brightness compensation value) may be acquired based on the brightness value of each pixel in the peep-proof area and the predetermined brightness value of each pixel group (for example, the predetermined brightness value of each pixel group minus the brightness value of corresponding pixel in the peep-proof area). By providing a driving signal corresponding to required brightness compensation value for each pixel in the compensation area, the image combined from the image displayed by the compensation area and the image displayed by the peep-proof area can be a white image or a predetermined image.

In an embodiment of the present disclosure, the above interference image is a white image with a predetermined grayscale, which is a preferred embodiment of an embodiment of the present disclosure. In actual application, the above interference image may also be other images having interference function, for example, may display words such as "thank you for watching", or display patterns such as flowers or apples. No limitation will be given here to the interference image.

For example, in the driving method provided by an embodiment of the present disclosure, the above predetermined value is preferably 300 nit. The predetermined value is set as 300 nit in a preferred embodiment of an embodiment of the present disclosure. In addition, the predetermined value may also be other values such as 250 nit or 200 nit. The predetermined value is not limited here.

For example, in the above driving method provided by an embodiment of the present disclosure, the first brightness value is within the range of 50 nit-100 nit, and the second brightness value is within the range of 350 nit-800 nit.

That is to say, on the basis that the sum of the first brightness value and the second brightness value is the predetermined value, the second brightness value of the pixels in the compensation area is set to be a large value, and the second brightness value of the pixels in the peep-proof area is set to be a small value, thereby improving the interference capability of the image combined from the peep-proof area and the compensation area. In actual application, the first brightness value and the second brightness value may vary within a certain range, as long as the sum of the first brightness value and the second brightness value is equal to the predetermined value. For example, the peep-proof area includes six pixels of which the brightness values are respectively 60 nit, 65 nit, 70 nit, 80 nit, 85 nit and 90 nit, and the brightness values of the pixels in the compensation area adjacent to the six pixels may be 430 nit, 425 nit, 420 nit, 410 nit, 405 nit and 400 nit. Here takes the case that the predetermined value is equal to 490 nit as an example. The predetermined value may also be set to be other values and will not be limited here.

In the display device, the manufacturing method thereof and the display system provided by an embodiment of the present disclosure, in the peep-proof display mode, the peep-proof area displays the peep-proof image, and the image combined from the image displayed by the compensation area and the image displayed by the peep-proof area is the interference image, so the user wearing the pair of peep-proof glasses can view the peep-proof image and the image viewed by the user who watches the display device with naked eyes is the interference image, thereby achieving the peep-proof effect. In normal display mode, the image combined from the image displayed by the peep-proof area and the image displayed by the compensation area is a normal display image, so the user who watches the display device with naked eyes can view the normal display image. Therefore, peep-proof display does not affect the display effect of normal display, thereby alleviating the problem of poor display effect of the peep-proof display device.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A display device, comprising: a display panel, a polarizer disposed on a light emitting surface of the display panel, and a phase retarder disposed on a light emitting surface of the polarizer,
wherein a display region of the display panel comprises a peep-proof area and a compensation area;
the phase retarder comprises: a first phase retarder corresponding to the peep-proof area and a second phase retarder corresponding to the compensation area;
both the first phase retarder and the second phase retarder are a quarter-wave phase retarder; and
the first phase retarder and the second phase retarder are configured to respectively convert light that is incident into the first phase retarder and light that is incident into the second phase retarder into polarized light with opposite rotation directions, in operation.

2. The display device according to claim 1, wherein the first phase retarder and the second retarder are configured to convert the light that is incident into the first phase retarder and the light that is incident into the second phase retarder respectively into left-handed polarized light and right-handed polarized light, in operation; or
the first phase retarder and the second phase retarder are configured to convert the light that is incident into the first phase retarder and the light that is incident into the second phase retarder respectively into right-handed polarized light and left-handed polarized light, in operation.

3. The display device according to claim 1, wherein the first phase retarder and the second phase retarder have complementary phase retardation characteristics; and
an absolute value of a phase retardation value caused by the first phase retarder and an absolute value of a phase retardation value caused by the second phase retarder are both equal to $\pi/2$.

4. The display device according to claim 1, wherein an included angle between a fast axis direction of the first phase retarder and a fast axis direction of the second phase retarder is 90°.

5. The display device according to claim 1, wherein the polarizer is configured to converter light that is emitted by the display device and incident into the polarizer into linearly polarized light, in operation;
an included angle between a transmission axis of the polarizer and an optical axis of the first phase retarder and an included angle between the transmission axis of the polarizer and an optical axis of the second phase retarder are both 45°; and both the first phase retarder and the second phase retarder are configured to convert the linearly polarized light into circularly polarized light, in operation.

6. The display device according to claim 1, wherein in a peep-proof display mode, an image displayed by the peep-proof area is a peep-proof image, and an image combined from an image displayed by the compensation area and the image displayed by the peep-proof area is an interference image; and in a normal display mode, the image combined from the image displayed by the compensation area and the image displayed by the peep-proof area is a normal display image.

7. The display device according to claim 6, further comprising a controller, wherein the controller is configured to allow the image combined from the image displayed by the compensation area and the image displayed by the peep-proof area to be a white image or a predetermined image.

8. The display device according to claim 6, further comprising a controller, wherein the controller is configured to allow an average brightness of the image displayed by the compensation area to be greater than a maximum value of an average brightness of the image displayed by the peep-proof area in the peep-proof display mode; and the controller is further configured to allow a ratio of the average brightness of the image displayed by the compensation area to the maximum value of the average brightness of the image displayed by the peep-proof area to be about 3-16 in the peep-proof display mode.

9. The display device according to claim 1, wherein the display panel comprises a plurality of pixels arranged in an array; and the peep-proof area comprises at least one pixel, and the compensation area comprises at least one pixel.

10. The display device according to claim 9, wherein the display panel comprises a plurality of peep-proof areas and a plurality of compensation areas; and the plurality of peep-proof areas and the plurality of compensation areas are alternately arranged in at least one of a row direction or a column direction.

11. The display device according to claim 10, wherein the plurality of peep-proof areas comprise pixels in odd rows, and the plurality of compensation areas comprise pixels in even rows; or the plurality of peep-proof areas comprise pixels in even rows, and the plurality of compensation areas comprise pixels in odd rows; or the plurality of peep-proof areas comprise pixels in odd columns, and the plurality of compensation areas comprise pixels in even columns; or the plurality of peep-proof areas comprise pixels in even columns, and the plurality of compensation areas comprise pixels in odd columns; or each compensation area comprises two rows of pixels, and each peep-proof area comprises one row of pixels; or each compensation area comprises two columns of pixels, and each peep-proof area comprises one column of pixels.

12. The display device according to claim 1, wherein an orthographic projection of the first phase retarder on the display panel is overlapped with the peep-proof area; and an orthographic projection of the second phase retarder on the display panel is overlapped with the compensation area.

13. A display system, comprising: a pair of peep-proof glasses and the, a display device, comprising: a display panel, a polarizer disposed on a light emitting surface of the display panel, and a phase retarder disposed on a light emitting surface of the polarizer, wherein a display region of the display panel comprises a peep-proof area and a compensation area; the phase retarder comprises: a first phase retarder corresponding to the peep-proof area and a second phase retarder corresponding to the compensation area; both the first phase retarder and the second phase retarder are a quarter-wave phase retarder; and the first phase retarder and the second phase retarder are configured to respectively convert light that is incident into the first phase retarder and light that is incident into the second phase retarder into polarized light with opposite rotation directions, in operation, wherein the pair of peep-proof glasses comprises a lens which is configured to transmit light outputted from the first phase retarder and block light outputted from the second phase retarder.

14. The display system according to claim 13, wherein the lens comprises a phase retardation film and a polarizing layer;

the lens comprises a light-incident side, and compared with the polarizing layer, the phase retardation film is closer to the light-incident side;

the phase retardation film is configured to convert the light outputted from the first phase retarder into first linearly polarized light and convert the light outputted from the second phase retarder into second linearly polarized light, in operation; and a polarization direction of the first linearly polarized light is parallel to a transmission axis of the polarizing layer, and a polarization direction of the second linearly polarized light is perpendicular to the transmission axis of the polarizing layer.

15. The display system according to claim 13, wherein the phase retardation film and the first phase retarder have same phase retardation characteristic, the phase retardation film and the second phase retarder have complementary phase retardation characteristics, and a transmission axis of the polarizing layer is perpendicular to a transmission axis of the polarizer; or the phase retardation film and the first phase retarder have complementary phase retardation characteristics, the phase retardation film and the second phase retarder have same phase retardation characteristic, and a transmission axis of the polarizing layer is parallel to a transmission axis of the polarizer.

16. The display system according to claim 13, wherein the pair of peep-proof glasses comprise a phase retardation film having same fast axis direction as the first phase retarder.

17. A driving method of a display device, comprising: a display panel, a polarizer disposed on a light emitting surface of the display panel, and a phase retarder disposed on a light emitting surface of the polarizer, wherein a display region of the display panel comprises a peep-proof area and a compensation area; the phase retarder comprises: a first phase retarder corresponding to the peep-proof area and a second phase retarder corresponding to the compensation area; both the first phase retarder and the second phase retarder are a quarter-wave phase retarder; and the first phase retarder and the second phase retarder are configured to respectively convert light that is incident into the first phase retarder and light that is incident into the second phase retarder into polarized light with opposite rotation directions, in operation, the method comprises:

in a peep-proof display mode, inputting peep-proof display signals into pixels in the peep-proof area, and inputting compensation display signals into pixels in the compensation area, so as to allow an image displayed by the peep-proof area to be a peep-proof image and allow an image combined from an image displayed by the compensation area and the image displayed by the peep-proof area to be an interference image; and in a normal display mode, inputting first display signals into the pixels in the peep-proof area, and inputting second display signals into the pixels in the compensation area, so as to allow the image combined from the image displayed by the peep-proof area and the image displayed by the compensation area to be a normal display image.

18. The driving method according to claim 17, wherein in the peep-proof display mode, the image combined from the image displayed by the compensation area and the image displayed by the peep-proof area is a white image or a predetermined image.

19. The driving method according to claim 17, wherein in the peep-proof display mode, an average brightness of the image displayed by the compensation area is greater than a maximum value of an average brightness of the image displayed by the peep-proof area; and in the peep-proof display mode, a ratio of the average brightness of the image displayed by the compensation area to the maximum value of the average brightness of the image displayed by the peep-proof area is about 3-16.

20. The driving method according to claim 17, wherein the inputting the peep-proof display signals into the pixels in the peep-proof area and inputting the compensation display signals into the pixels in the compensation area in the peep-proof display mode comprises:

in the peep-proof display mode, inputting peep-proof display signals corresponding a first brightness into the pixels in the peep-proof area, and inputting compensation display signals corresponding to a second brightness into the pixels in the compensation area; and allowing a sum of the second brightness of the pixels in the compensation area and the first brightness of the pixels in the peep-proof area adjacent to the compensation area to be a predetermined value, so as to allow the interference image to be an image with a grayscale corresponding to a predetermined value; and the predetermined value is 300 nit; and/or the first brightness is within 50 nit-100 nit, and the second brightness is within 350 nit-800 nit.

* * * * *